(12) United States Patent
Robinson (10) Patent No.: US 12,313,219 B1
(45) Date of Patent: May 27, 2025

(54) HANGING BRACKET DEVICE

(71) Applicant: David W. Robinson, Apopka, FL (US)

(72) Inventor: David W. Robinson, Apopka, FL (US)

( * ) Notice: Subject to any disclaimer, the term of this patent is extended or adjusted under 35 U.S.C. 154(b) by 0 days.

(21) Appl. No.: 19/036,358

(22) Filed: Jan. 24, 2025

(51) Int. Cl.
*F16M 13/02* (2006.01)
*A47G 7/00* (2006.01)

(52) U.S. Cl.
CPC ............. *F16M 13/022* (2013.01); *A47G 7/00* (2013.01)

(58) Field of Classification Search
CPC ................................ F16M 13/022; A47G 7/00
USPC ................................................ 248/200, 27.8
See application file for complete search history.

(56) References Cited

U.S. PATENT DOCUMENTS

| | | | |
|---|---|---|---|
| 9,307,700 B1 * | 4/2016 | Schmitt | E04H 13/001 |
| 9,439,529 B1 * | 9/2016 | Libertowski | A47K 10/10 |
| 11,802,654 B1 * | 10/2023 | Higdon | F16M 13/02 |
| 2024/0182228 A1 * | 6/2024 | Carter | F16M 13/022 |

* cited by examiner

*Primary Examiner* — Todd M Epps
(74) *Attorney, Agent, or Firm* — Jason T. Daniel, Esq.; Daniel Law Offices, P.A.

(57) ABSTRACT

A hanging bracket device includes an L-shaped main body having shaft housing positioned along the top surface at a location adjacent to the back end. The housing includes a pair of channels extending from the front end to the back end of the housing body. A pair of engagement posts each having a handle an elongated shaft, and a latch portion are positioned within the channels such that the latch portions extend outward from the back end of the housing at a location adjacent to the bend. The engagement posts are positioned to align with a pair of spline channels on a screen enclosure frame member and rotate between a locked position and an unlocked position. In the locked position, the posts secure the main body onto the frame member, and a hook receives items to be suspended from the frame member.

9 Claims, 7 Drawing Sheets

HANGING BRACKET DEVICE

TECHNICAL FIELD

The present invention relates generally to brackets, and more particularly to a hanging bracket for screen enclosures.

BACKGROUND

The statements in this section merely provide background information related to the present disclosure and may not constitute prior art.

Many homes and other such locations include screened areas to provide people with a pleasant outdoor feeling while remaining protected from insects and adverse weather. In many instances, these screened areas function to enclose a pool or patio area, for example, and are generally constructed from a plurality of thin-wall aluminum extruded frame members having a plurality of spline channels along the outer edges. When abutting frame members are secured together, the spline channels are aligned and function to receive a screen enclosure that is held in place via an elastomeric bead that is positioned within the spline channel of the respective frame members.

Once installed, users often want to hang items such as plants, for example, from the frames within the screen enclosures. As such, most users obtain a commercially available wall bracket and attempt to secure the same onto the frame using screws, bolts, or other types of fasteners. Unfortunately, due to the thin wall construction of the frame members, these brackets often fail when attempting to hang a plant or other objects weighing more than about 5 pounds because the weight causes the fasteners to deform the soft metal of the frame and ultimately fall out causing damage to the hanging object. Moreover, once installed using such fasteners, a user cannot remove or reposition the bracket without leaving visible holes in the frames caused by the penetrating fasteners.

Accordingly, it would be beneficial to provide a hanging bracket device that can be quickly and easily installed onto (and removed from) a screen enclosure frame member so as to overcome the drawbacks described above.

SUMMARY OF THE INVENTION

The present invention is directed to a hanging bracket device. One embodiment of the present invention can include a generally L-shaped main body having a front end, a back end and a bend, and a pair of side edges. A housing can be positioned along the top surface of the main body at a location adjacent to the bend.

The housing can include a pair of channels extending from the front end to the back end of the body. A pair of engagement posts each having a handle an elongated shaft, and a latch portion can be positioned within the channels such that the latch portions extend outward from the back end of the housing at a location adjacent to the bend.

In one embodiment, the engagement posts can be positioned so as to align with a pair of spline channels on a screen enclosure frame members, and the posts can rotate between a locked position and an unlocked position. In the locked position, the posts can secure the main body onto the frame member such that the first end extends perpendicularly outward from the frame member.

In one embodiment, hanging connectors such as a hook or mounting holes can be positioned along the first end of the main body to receive and engage items such as plants or lights from the bracket.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "rotatably secured" and derivatives thereof shall be used to describe a situation wherein two or more identified objects are joined together in a manner that allows one or both of the objects to pivot, rotate, and/or move about or in relation to the other object in one or more of a horizontal, diagonal or vertical manner.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples of connectors include, but are not limited to, flexible strips of interlocking projections with a slider (i.e., zipper), thread-to-connect, twist-to-connect, and push-to-connect type devices, opposing strips of hook and loop material (e.g., Velcro®), attractively oriented magnetic elements or magnetic and metallic elements, buckles such as side release buckles, clamps, sockets, clips, carabiners, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

As defined herein, the terms "immovably positioned" and "immovably affixed" refer to the ability of the assembled bracket to remain secured onto a screen room frame member without moving when while receiving and hanging items having a weight of up to 50 pounds or more.

FIGS. 1-7 illustrate one embodiment of a bracket device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," ""front," "vertical," "horizontal," and derivatives thereof shall relate to the invention as oriented in FIG. 7.

Figure 1:
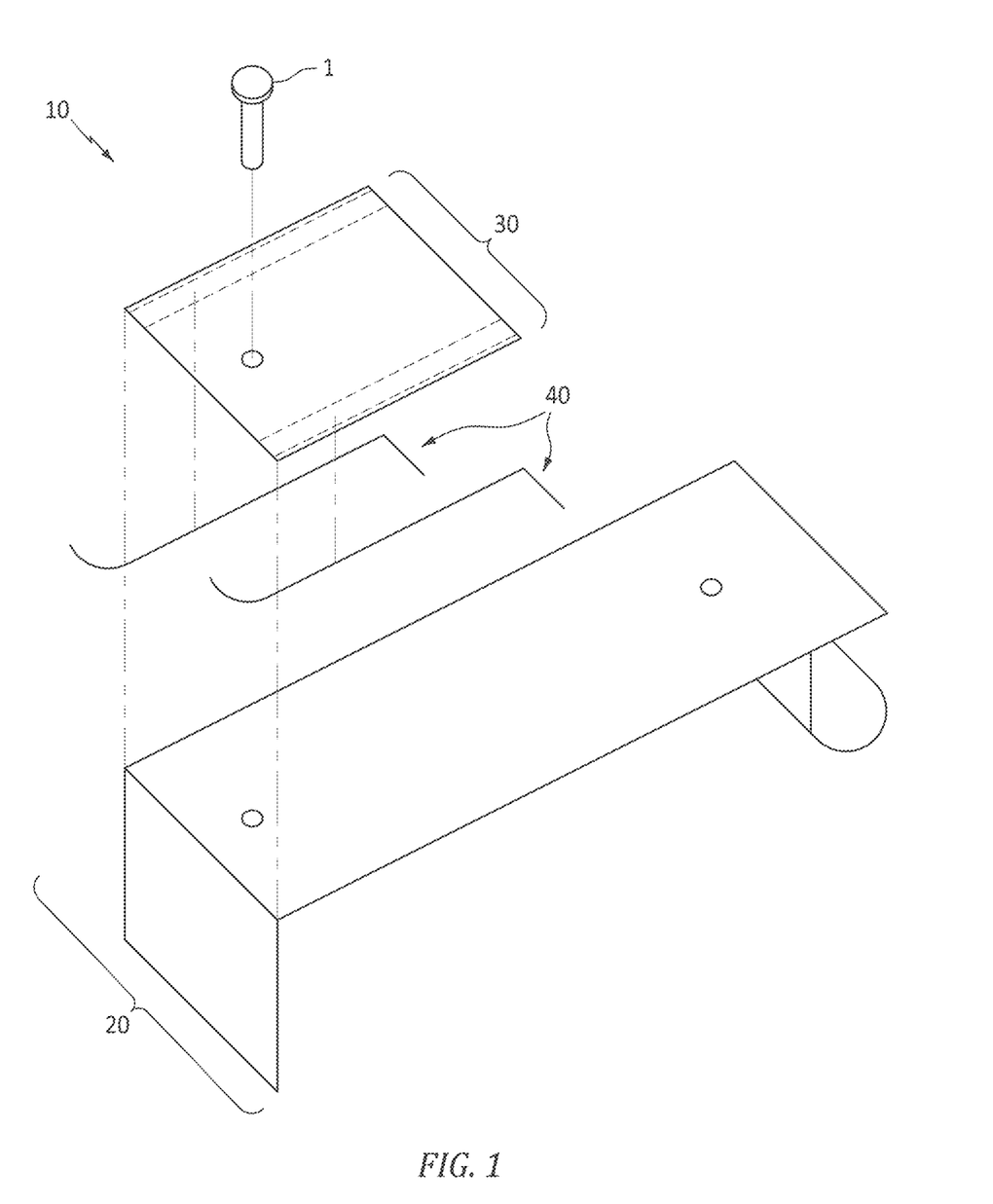
FIG. 1 is an exploded parts view of a hanging bracket device, in accordance with one embodiment of the invention.

As shown in the exploded parts view of FIG. 1, the device 10 can include, essentially, a main body 20, a shaft housing 30, and a pair of engagement posts 40 for removably engaging the spline channels of a screen enclosure frame member to allow users to suspend any number of different items therefrom.

Figure 2:
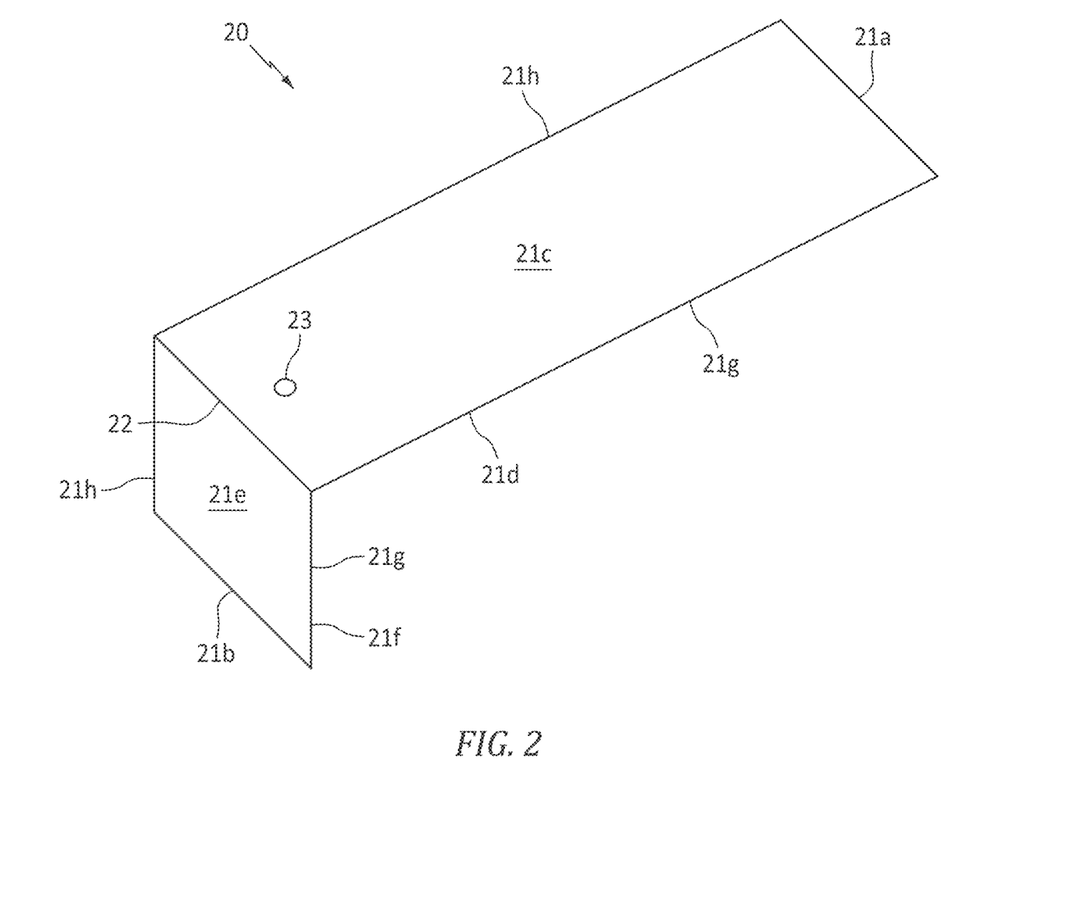
FIG. 2 is a perspective view of the main body of the hanging bracket device, in accordance with one embodiment of the invention.

As shown best at FIG. 2, one embodiment, the main body 20 can include an elongated generally L-shaped member having a first end 21a, a second end 21b a top surface 21c, a bottom surface 21d, a back surface 21e, a front surface 21f, and a pair of side edges 21g and 21h. In the preferred embodiment, the first end and the second ends can be oriented perpendicular to each other via a bend 22 extending between the side edges, and a hole 23 can be positioned along the main body at a location adjacent to the bend.

In the preferred embodiment, the main body 11 can be formed from a single piece of ⅛" aluminum bar that is bent to form the illustrated L-shape. Additionally, the main body will preferably be constructed to include a width (e.g., distance between the pair of side edges) of about 2 inches, so as to be complementary to the width of the most commonly sized commercially available frame member for screen enclosures.

However, any number of other shapes, sizes and relatively strong and stiff construction materials may also be utilized. Several nonlimiting examples include but are not limited to various metals or metal alloys (e.g., steel, titanium, or alloys thereof), various plastic/polymers, various natural materials such as wood, and/or various composite materials, for example.

Figure 3:
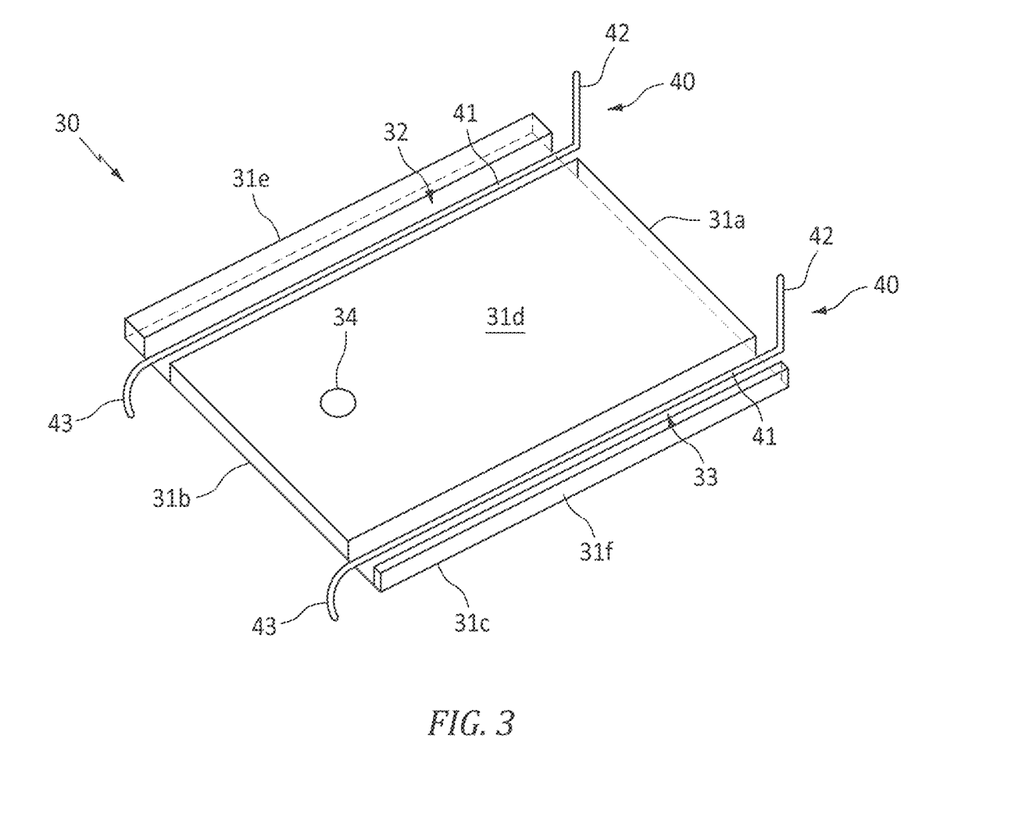
FIG. 3 is a bottom view of the shaft housing of the hanging bracket device, in accordance with one embodiment of the invention.

As shown best at FIG. 3, one embodiment of the shaft housing 30 can include a generally rectangular-shaped member having a front end 31a, a back end 31b, a top surface 31c, a bottom surface 31d and a pair of side surfaces 31e and 31f. As shown, a pair of channels 32 and 33 can be positioned along the bottom surface so as to extend between the front and back ends in a parallel orientation with the sides.

In one embodiment, each of the channels can include a width (e.g., side to side) and a thickness/depth (e.g., distance between the top and bottom surfaces) that is complementary to the width and thickness of the shaft portions of the below described engagement posts, so as to prevent the posts from sliding horizontally or vertically when the device 10 is in operation. Additionally, the channels 32 and 33 will preferably include a separation distance from each other of about 1.5 inches, so as to be complementary to the separation distance between the spline channels of the screen enclosure frame member to which the device is to be secured.

In the preferred embodiment, the housing will be constructed from the same construction material as the main body, and will also include an opening 34 that is positioned at a location complementary to the hole 23 to receive hardware 1 such as a mounting bolt and nut combination, for example, to secure the housing onto the main body.

Although described above with regard to a particular shape, size or construction material, this is for illustrative purposes only, as the housing may be constructed from different materials and can include any number of different shapes and sizes suitable for allowing the engagement posts to engage the spline channels of a screen enclosure frame member.

In one embodiment, each of the engagement posts 40 will include an elongated shaft 41 with a handle 42 along a first end and a curved latch portion 43 along a second end. In one embodiment, each of the latch portions can include a curved shape extending about 90 degrees relative to the shaft 41, so as to be capable of engaging the spline channels on most commercially available screen enclosure frames. Of course, each of the latch portions can also be constructed include any number of different shapes and sizes so as to be complementary to the shape and size of a specific type of spline channel such as flat channel or round spline channels, for example, without undue experimentation.

Figure 4:
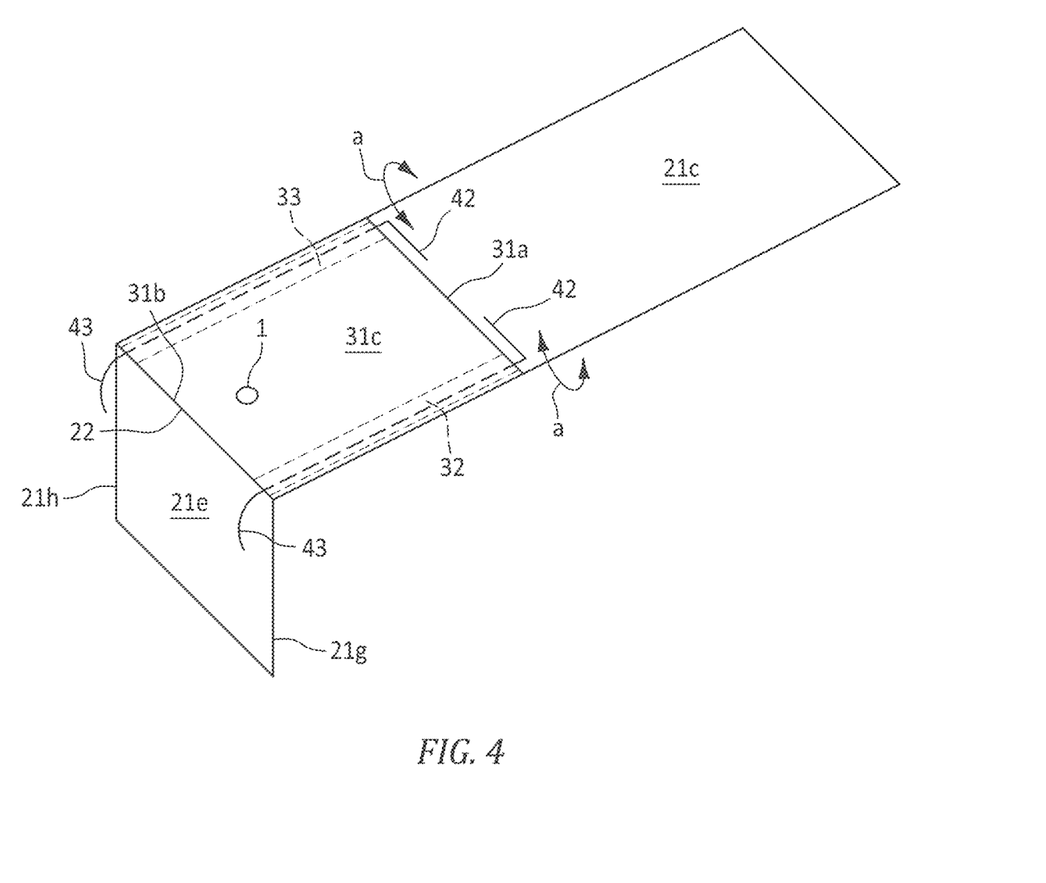
FIG. 4 is a perspective view of the hanging bracket device, in accordance with one embodiment of the invention.

As shown best at FIG. 4, when the housing is secured onto the main body via the hardware 1, the back end 31b will be aligned with the bend 22 so as to be flush with the back surface 21e. Additionally, each of the posts 40 will be located within the channels 32 and 33 such that the latch portions 43 extend out from the back ends of the housing and main body 31b and 21e, respectively. When so positioned, the shafts will be able to rotate (see arrow a) within the channels via a movement of the handles 42 to transition the latch portions 43 between the unlocked vertical position shown at FIG. 3 where the latches do not extend beyond the side edges of the housing or main body, and the locked horizontal position shown at FIG. 4 where the latches extend perpendicularly from the sides of the main body 21g and 21h.

Although described above with regard to two posts that transition between locked and unlocked positions via rotation of handles, this is but one possible implementation of the inventive concepts. To this end, those of skill in the art will recognize that any number of different mechanisms may be utilized for selectively moving the latches may also be utilized. For example, other embodiments may utilize a spring-loaded lever that moves the latches via a squeezing motion, or other such means.

Figure 5:
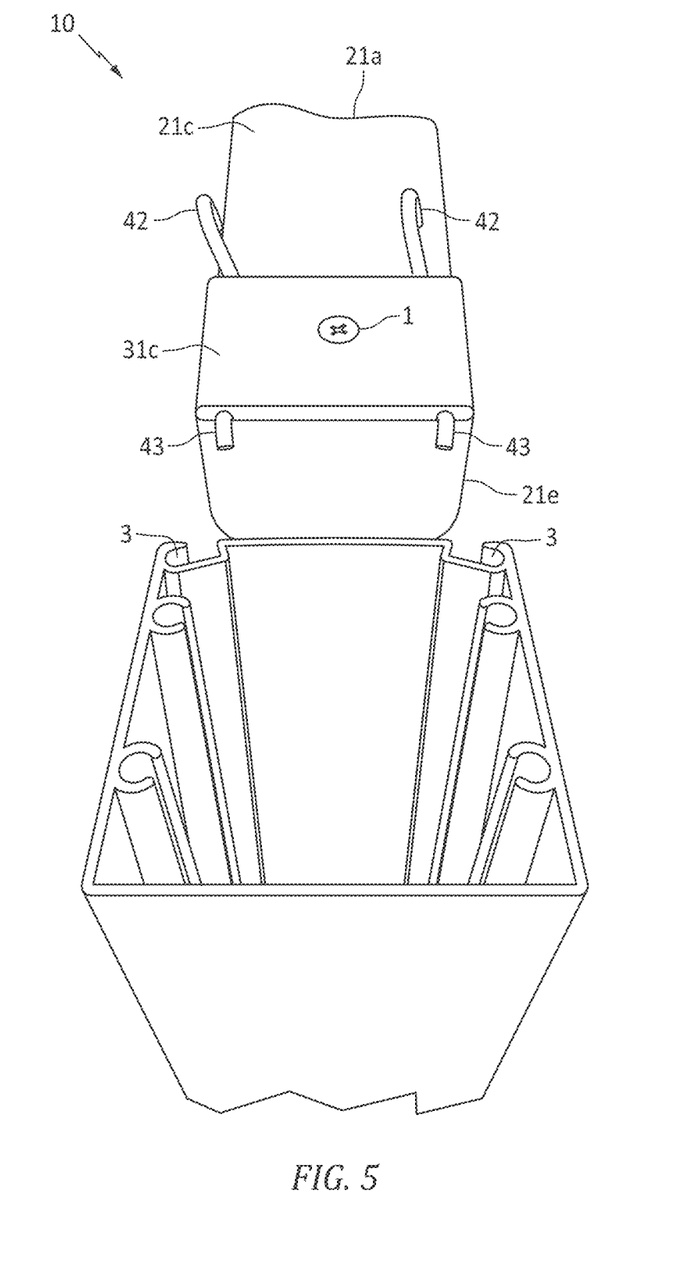
FIG. 5 is a back perspective view of the hanging bracket device in operation, in accordance with one embodiment of the invention.
Figure 6:
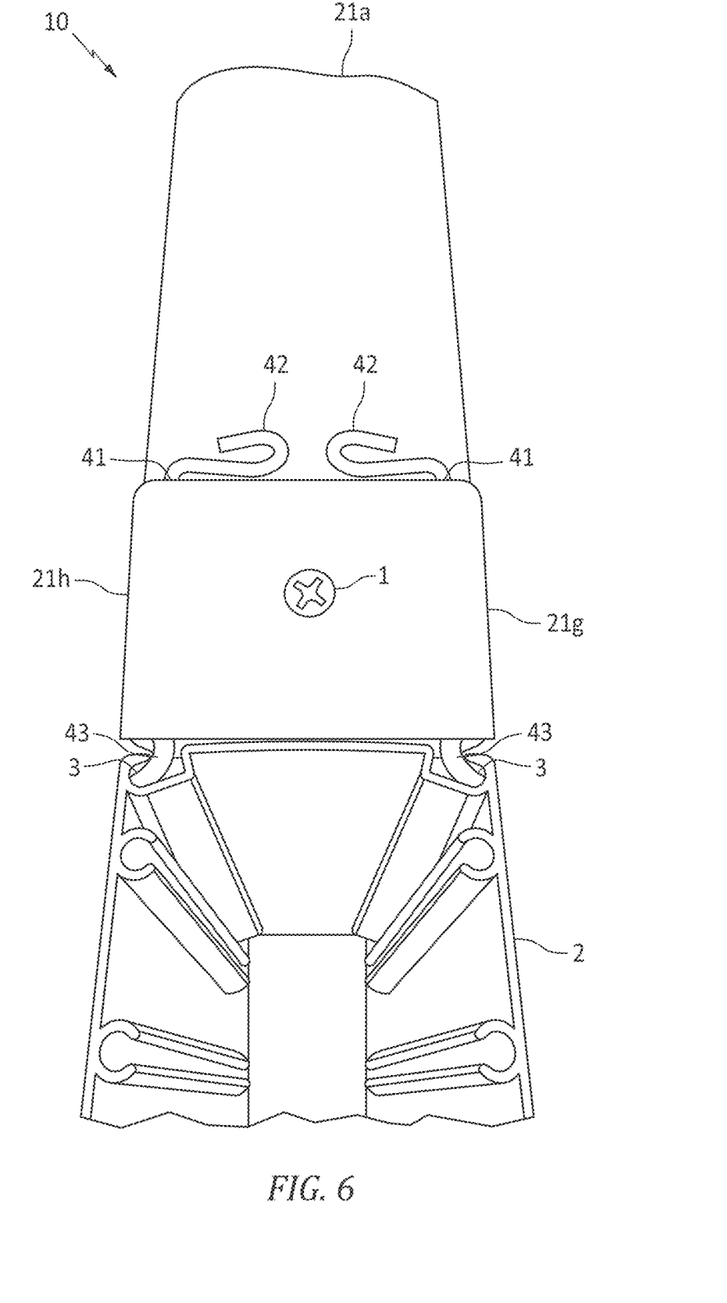
FIG. 6 is a top view of the hanging bracket device in operation, in accordance with one embodiment of the invention.
Figure 7:
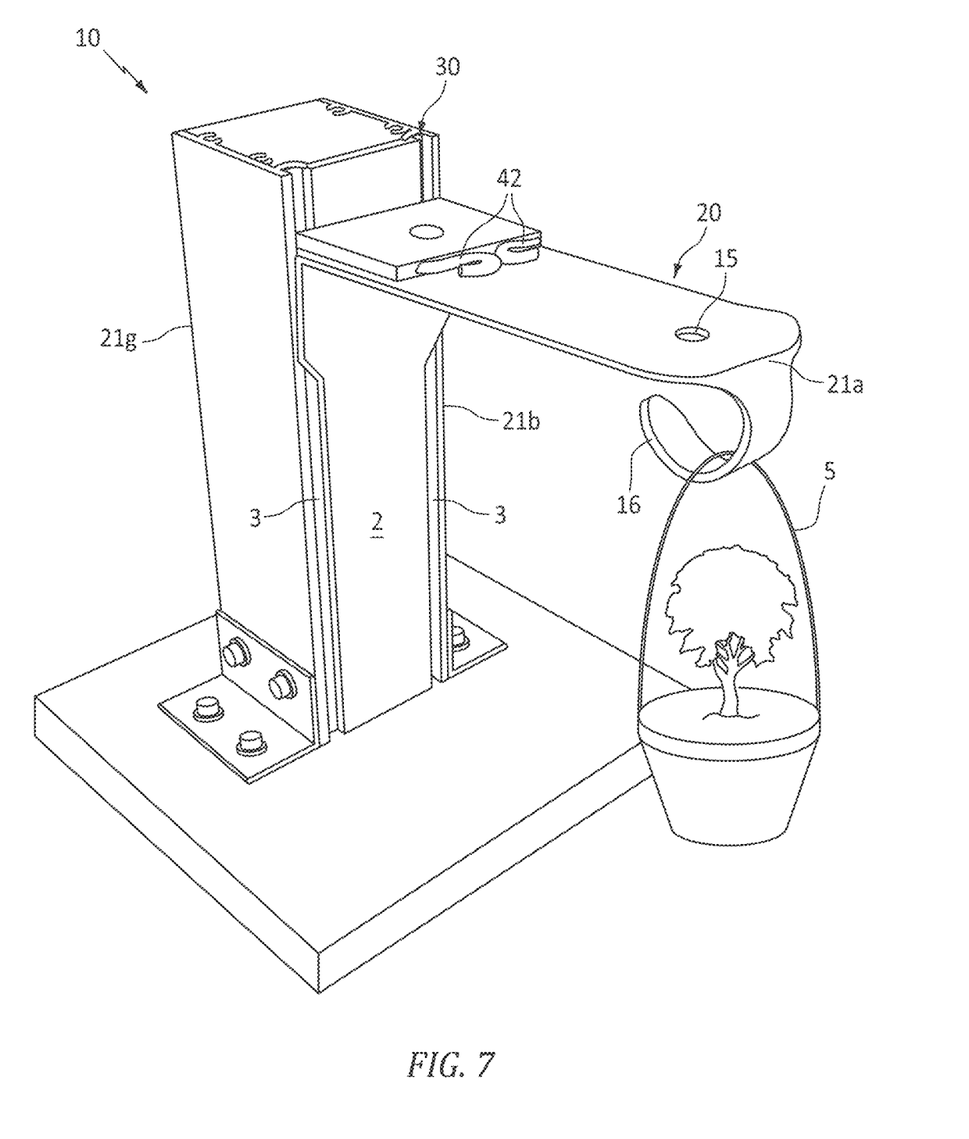
FIG. 7 is a front perspective view of the hanging bracket device in operation, in accordance with one embodiment of the invention.

FIGS. 5-7 illustrate one embodiment of the device 10 in operation. As shown, the device in the unlocked orientation can be positioned such that the back surface 21e of the main body is against the wall of the screen enclosure frame member 2 with the latch portions 43 aligned with and inserted into the spline channels 3. Next, the handles can be rotated to transition the latch portions to the locked/horizontal position where they can engage the inner walls of the spline channels 3, thus locking the device 10 onto the frame member with the back surface 21e against the frame member 1 and the first end 21a of the main body extending outward therefrom at a perpendicular angle.

In this orientation, the device 10 will remain securely and immovably affixed onto the frame member via the tension imparted by the orientation of the latch portions within the spline channels, and the back surface of the main body against the frame member. When so positioned, any number of secondary objects 5 such as plants, bird feeders or the like can be secured onto the device 10 directly or via any number of openings 15, hooks 16 or other such connectors that can be located along the main body.

Although illustrated with regard to a single device 10, other embodiments are contemplated wherein a plurality of brackets 10 are provided individually or as a kit to permit a user to suspend a board between two brackets on a screen enclosure to form a shelf.

Accordingly, the above noted device allows a user to quickly and easily suspend any number of different objects from the frame member of a screen enclosure. Moreover, because the bracket utilizes the spline channels and is held in place via the compressive force described above, it is possible for a user to remove and reposition the device 10 at any time without causing damage to the frame member 1.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A bracket, comprising:
    a main body having a front end, a back end and a pair of side edges;
    a shaft housing having a front end, and a back end, said shaft housing being connected to the main body; and
    a pair of engagement posts that are connected to the main body and the shaft housing,
    wherein the pair of engagement posts include a separation distance from each other that is complementary to a separation distance of a pair of spline channels on a screen enclosure frame member, and
    wherein the pair of engagement posts are configured to selectively engage the pair of spline channels to suspend the main body from the screen enclosure frame member.

2. The device of claim 1, wherein the main body includes a generally L-shaped member having a bend located between the front end and the back end.

3. The device of claim 2, further comprising:
    a first hole that is positioned through the main body at a location adjacent to the bend.

4. The device of claim 3, further comprising:
    a second hole that is positioned through the shaft housing at a location adjacent to the bend.

5. The device of claim 4, wherein the first hole and the second hole are configured to be aligned and to receive a bolt to secure the housing onto the main body.

6. The device of claim 1, wherein the shaft housing is positioned along a top surface of the main body adjacent to the bend.

7. The device of claim 1, further comprising:
    a hook that is positioned adjacent to the first end of the main body, said hook being configured to suspend a secondary item from the main body.

8. The device of claim 1, further comprising:
    a hole that is positioned adjacent to the first end of the main body, said hole being configured to receive a hook to suspend a secondary item from the main body.

9. The device of claim 1, wherein each of the main body, the shaft housing and the pair of engagement posts are constructed from metal.

* * * * *